March 4, 1930.　　　S. EINSTEIN ET AL　　　1,749,328
DEAD CENTER GRINDER
Filed Jan. 19, 1924　　　2 Sheets-Sheet 1
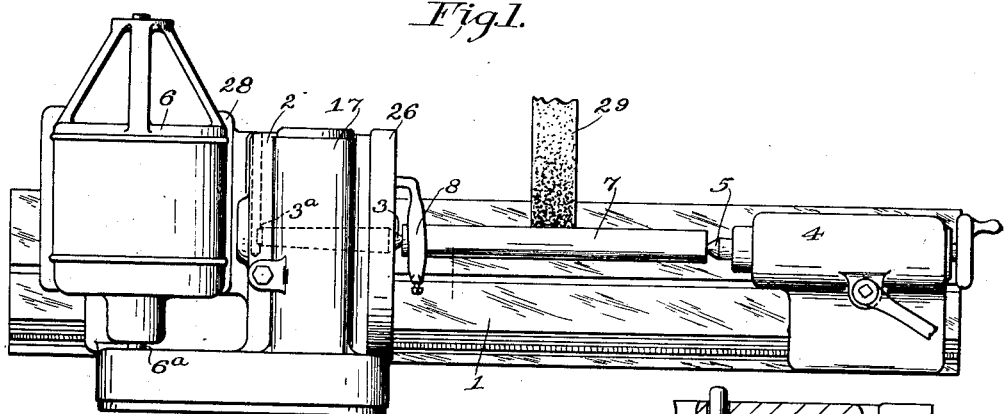
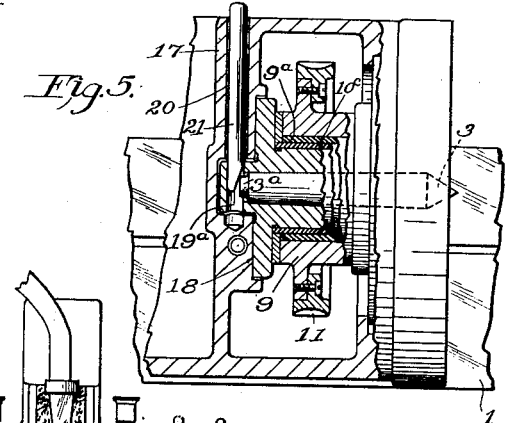
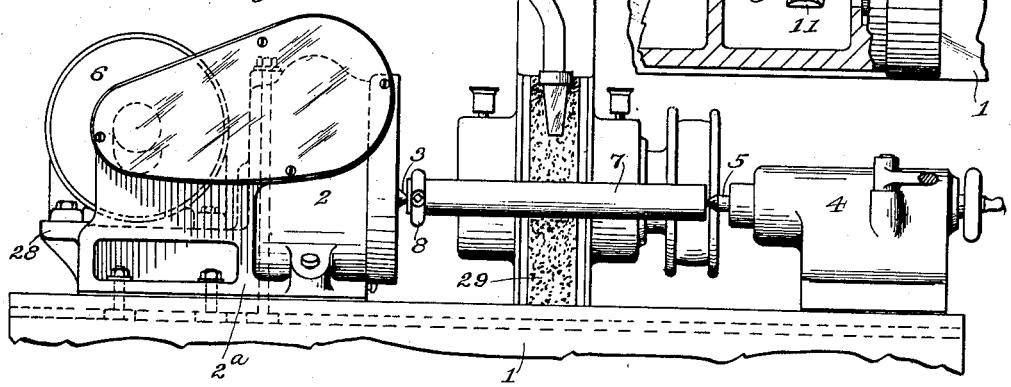
Inventors
Sol Einstein and
Albert Turner
By Albert F. Nathan Attorney March 4, 1930.  S. EINSTEIN ET AL  1,749,328
DEAD CENTER GRINDER
Filed Jan. 19, 1924  2 Sheets-Sheet 2

Inventors
Sol Einstein and
Albert Turner
By Albert F. Nathan Attorney

Patented Mar. 4, 1930

1,749,328

UNITED STATES PATENT OFFICE

SOL EINSTEIN AND ALBERT TURNER, OF CINCINNATI, OHIO, ASSIGNORS, BY MESNE ASSIGNMENTS, TO CINCINNATI GRINDERS INCORPORATED, OF CINCINNATI, OHIO, A CORPORATION OF OHIO

DEAD-CENTER GRINDER

Application filed January 19, 1924. Serial No. 687,252.

This invention relates to improvements in lathes or grinding machines.

One of the objects of this invention is to produce a construction of lathe or grinding machine in which the parts will be so arranged and supported on the bed of the machine as to neutralize the effect on the work of vibrations from the driving parts by changing the direction of such vibrations, thus enabling greater accuracy in work to be accomplished by the lathe or grinding machine.

Another object of our invention is so to arrange a power-unit on a lathe or grinding-machine carriage adjacent to the head-stock thereof as to cause the motor, driving gear and head-stock to form an extremely compact structure and to occupy a minimum of space.

Another object of our invention is to produce a lathe or grinding machine of the self-contained power-unit type in which an electric motor may, without materially increasing or transmitting harmful vibrations to the work, be mounted upon the carriage or saddle and to this end, the motor is disposed transversely of the axis of the work centers so as to change the direction of the vibrations from the rotating parts of such motor to cause the same to act on the centers and work in a longitudinal direction or axially instead of in the usual transverse of diametric direction, thus substantially neutralizing the effect of such vibrations upon the diameter of the work and also permitting the motor to be located in a position closely adjacent to the front center and work-rotating member.

Another object of this invention is further to promote accuracy and add to the compactness of the device by solidly supporting on the carriage a dead spindle to serve as a mounting element for a dead center and also as an axle about which a work-rotating member coaxial with the dead center rotates and by utilizing a motion-transmitting mechanism including a worm-wheel coaxial with and preferably mounted on the work-rotating member, a transverse worm and worm shaft parallel with the motor shaft, and a longitudinally-disposed sprocket and chain drive connecting the worm and motor shafts.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of a grinding lathe embodying our invention;

Fig. 2 is a side elevation of the lathe shown in Fig. 1;

Fig. 5 is a fragmentary plan partly broken away to show in horizontal section the means preferably employed for removing the front dead center.

Figure 3:
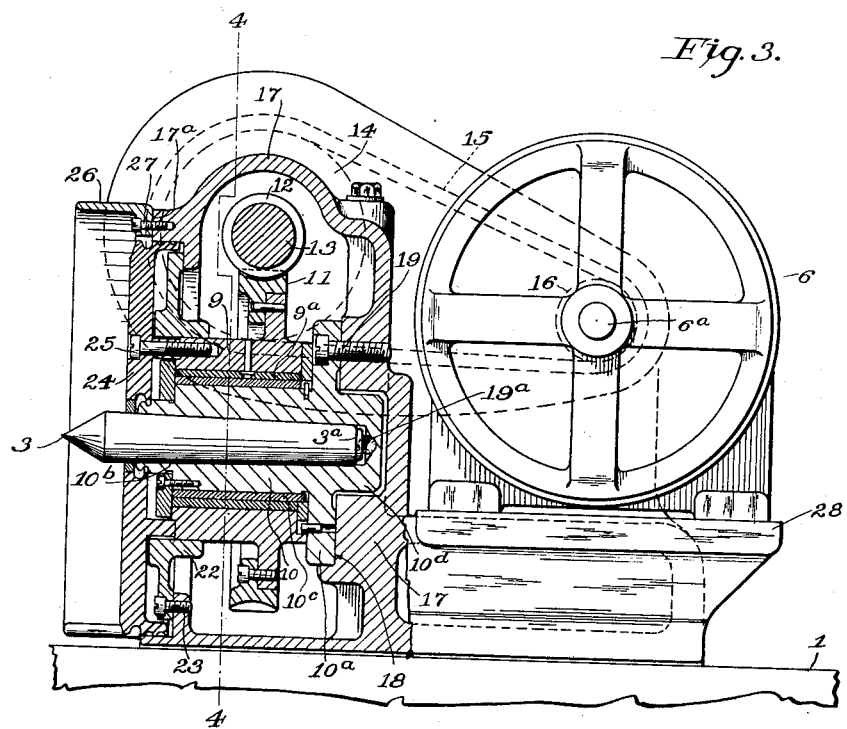
Fig. 3 is a side view partly in vertical section through the gear housing and work rotating mechanism.
Figure 4:
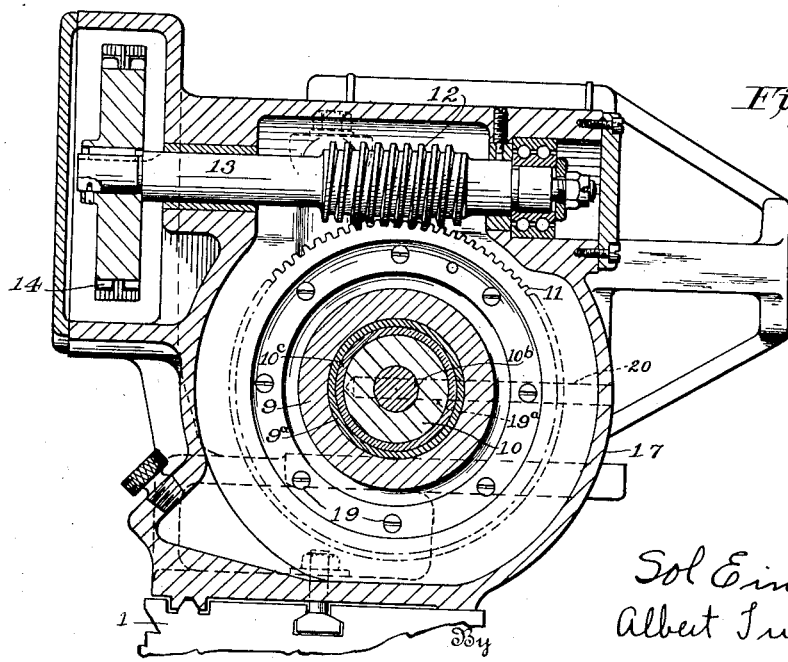
Fig. 4 is a vertical section on the line 4—4 of Fig. 3.

Referring now to these drawings, 1 indicates a lathe-bed, which may be of any conventional form. Mounted at one end of the said bed on a carriage or saddle $2^a$ is a head-stock 2 having a work-center 3 preferably comprising a dead center, and at the opposite end of said bed a tail stock 4 is provided with the usual dead center 5.

Mounted on the carriage $2^a$ is a self-contained power unit preferably comprising an electric motor 6. In accordance with our invention, the motor 6 is disposed across the said bed transversely of the axis of the work centers 3 and 5 and of the axis of the work 7 suspended therein, which axes are as usual disposed longitudinally of the said bed. In the preferred embodiment shown, the centers 3 and 5 are, as aforesaid, both dead centers and the work 7 is rotated by means of a dog or carrier 8 suitably connected to a live or rotating member 9 mounted in coaxial relationship with the dead center 3 and, as shown, mounted to rotate on a hollow dead spindle 10 in which the dead front center 3 is mounted. Power may be transmitted from the transversely-disposed motor-shaft $6^a$ of the motor 6 to work-rotating member 9 in any suitable manner. In the embodiment shown, the rotating member 9 comprises the hub of a worm wheel 11 which meshes with a worm 12 on a transverse shaft 13 having fast thereon sprocket 14 connected by chain 15 to a sprocket 16 fast on the motor shaft $6^a$.

It will be understood that any vibrations of rotating parts of the motor will be substantially transverse to the axis of its shaft and that the disposition of the motor shaft transversely to the axis of the work centers and having its supporting bearings on opposite sides of and substantially symmetrical to the work centers, will neutralize the effect of such vibrations on the work because in view of the disposition of the motor, they will as transmitted, move longitudinally or axially of the work centers and therefore will in no way affect the diameter or transverse measurement of the work. Accuracy in work and compactness of structure will also be promoted by utilizing our self-contained power unit or motor in combination with a carriage in which the dead spindle having a dead center is properly supported to permit the work-rotating member to be rotated about the same and the work to be rotated by means of the conventional lathe dog or carrier, and in the preferred embodiment shown the carriage or saddle is provided with an enclosing hollow housing 17 open at its front edge $17^a$, the interior rear wall of which is provided with an accurately-formed seat 18 into which an annular flange $10^a$ of the dead spindle 10 fits and through which flange said spindle is connected to the said rear wall by screws 19. Said spindle 10 is provided with an accurately formed seat $10^b$ for the front work center 3 which is securely and tightly fitted therein and is preferably removable by providing said dead spindle with a rearward extension $10^d$ projecting rearwardly of the seat 18 and provided with a transverse channel $19^a$ communicating with the bore or seat $10^b$ in said spindle to permit the insertion of a tool 21 between the bottom of the bore $10^b$ and the rear end $3^a$ of the dead center to remove the latter. The channel $19^a$, as shown, registers with a bore or channel 20 in the housing 17 through which the tool 21 may be inserted into engagement with the end of the said center without removing the said dead spindle from the housing. The dead spindle thus mounted will form an axle and main support for the rotating member 9 which, in the embodiment shown, is provided with a bushing $9^a$ which rotates on a bushing $10^c$ on the dead spindle. The outer end of the rotating member is preferably further supported by means of an annular bearing 22 which is fastened at the outer end of the enclosing casing by screws 23 and the casing is closed by means of a face plate 24 secured by screws 25 to the rotating member 9. A guard 26 is, as shown, connected by screws 27 to the outer open edge $17^a$ of the enclosing casing.

The motor 6 is positioned directly behind and closely adjacent to the rear wall of the enclosing casing on a base 28 preferably formed integrally with the casing and the shaft $6^a$ thereof is disposed at right angles to the axes of the work-rotating member and the coaxial work center and parallel to the axis of the transverse shaft 13, upon which the worm is mounted. Power from the transversely disposed motor shaft is transmitted by a longitudinally disposed chain or belt to the parallel shaft 13. An extremely compact structure, occupying a minimum amount of space, is thus produced.

In the embodiment illustrated an emery wheel 29 is shown in contact with the work. Obviously any other suitable adjuncts for operating on the work may be substituted for this emery wheel.

Having described our invention, we claim:

1. A lathe or grinding machine embodying, in combination, a suitable bed, a work-rotating member suitably supported on said bed, a member for directly connecting the work piece with the work rotating member, a dead work-centering means supported in coaxial relation with said work-rotating member, an electric motor having a pair of bearings supporting its rotating parts on said bed, said bearings being disposed transversely of the work centers on opposite sides thereof and substantially symmetrical thereto, and means for rotating the work from said electric motor, whereby vibrations from the said motor will be caused to act upon the work longitudinally and the effect thereof on the work will be substantially neutralized.

2. A lathe or grinding machine embodying, in combination, a suitable bed, a head-stock mounted on said bed and having a work-rotating member, a dead center coaxial with said work-rotating member, a tail-stock having an aligned center, a power-unit mounted on said bed and having parts rotating about an axis disposed transversely of said work centers, and means including a worm in direct engagement with a worm gear on the work rotating member and rotatable about an axis transverse to the axis of said work-rotating member, whereby vibrations from said unit will be caused to act upon the work longitudinally and the effect thereof on the work will be substantially neutralized.

3. A lathe or grinding machine embodying, in combination, a suitable bed, a tail-stock having a center on said bed, a carriage mounted on said bed, a work-rotating member supported on said carriage to rotate about an axis disposed longitudinally of the said bed and attached to the workpiece, a dead center also supported on said carriage in coaxial relation with said work-rotating member, a worm-wheel coaxially arranged on said work-rotating member, a transversely-disposed worm shaft having a worm meshing with said worm wheel, a power-unit also mounted on said carriage having the axis of its rotating parts disposed transversely of the work-rotating member and parallel with said worm shaft, and means for transmitting power from said power-unit to the worm shaft, whereby vibrations from said unit will be caused to act upon the work longitudinally and the effect thereof on the work will be substantially neutralized.

4. A lathe or grinding machine embodying, in combination, a suitable bed, a tail-stock mounted on said bed and having a center, a carriage mounted on said bed, a hollow dead-spindle supported on said carriage, a dead-center supported in said dead-spindle, a work-rotating member rotating upon said dead-spindle, a power-unit on said carriage having its shaft disposed transversely of the axis of rotation of said work-rotating member, a worm-wheel arranged coaxially on said work-rotating member, a worm-shaft having a worm meshing with said worm wheel and disposed parallel to said power-unit shaft, and a longitudinally-disposed gear connecting the worm shaft with the power-unit, whereby vibrations from such unit will be caused to act upon the work longitudinally and the effect thereof on the work will be substantially neutralized.

5. A lathe or grinding machine embodying, in combination, a suitable bed, a tail-stock mounted on said bed and having a center, a carriage mounted on said bed, an enclosing housing having an open end, a hollow dead-spindle supported within said housing, a dead center supported in said dead-spindle, a work-rotating member and worm-wheel rotating within said housing on said dead-spindle, a transverse worm-shaft supported in said housing and having a worm meshing with said worm wheel, an electric motor on said carriage adjacent to said housing and having its shaft disposed transversely of the axis of rotation of said work-rotating member, bearings being provided for said motor on opposite sides of said work rotating axis and substantially symmetrical with respect thereto, and a longitudinally-disposed gear connecting the worm shaft with the electric motor, whereby vibrations from such motor will be caused to act upon the work longitudinally and the effect thereof on the work will be substantially neutralized.

6. A lathe or grinding machine embodying, in combination, a suitable bed, a tail-stock mounted on said bed and having a dead center, a head-stock also mounted on said bed, a hollow dead spindle supported on the head stock, a dead center supported in said dead spindle, a work rotating member rotating about said dead spindle, a shaft mounted transversely to the axis of rotation of said work member, a power unit mounted adjacent to said head-stock and having the axis of its moving parts disposed transversely of the axis of rotation of said work rotating member, a flexible connection between said power unit and the shaft, and means comprising a worm and a worm wheel for transmitting motion from said shaft to the work rotating member.

7. A lathe or grinding machine, embodying, in combination, a suitable bed, a head-stock mounted on said bed, a dead spindle supported in said head-stock and having a bore, a work rotating member supported on said bed and rotating about an axis disposed longitudinally on said bed, a power unit also supported on said bed and having rotating parts moving upon an axis disposed transversely of the axis of the work rotating member, a dead center fitted within said bore and a transverse channel in said dead spindle at the rear thereof communicating with said bore to permit the insertion of a tool between the end of said dead spindle and the bottom of the bore to remove the said center.

8. A lathe or grinding machine, embodying, in combination, a suitable bed, a head-stock mounted on said bed, a housing open at one end enclosing said head-stock, a dead spindle supported within said housing and having a bore, a dead center fitted within said bore, a work rotating member supported on said bed and rotating about an axis disposed longitudinally on said bed, a power unit also supported on said bed and having rotating parts moving upon an axis disposed transversely of the axis of the work rotating member, a transverse channel in said dead spindle at the rear thereof communicating with said bore, and a channel through said enclosing housing registering with the transverse channel in the dead spindle to permit the insertion of a tool through the housing and dead spindle to remove said center.

9. A lathe or grinding machine combining a bed; a work-rotating member supported thereon; an element secured thereto adapted to be power driven; work centering and supporting means associated with said member; a power unit supported on said bed and so positioned that the rotary elements rotate about an axis transverse to the work axis; and a driving connection between said power unit and said power driven element each of the rotary parts of said connection being arranged to rotate about an axis transverse to the work axis whereby normal vibrations thereof will be transmitted to the work to act longitudinally thereof and the effect substantially neutralized.

In witness whereof, we hereunto subscribe our names.

SOL EINSTEIN.
ALBERT TURNER.